(No Model.) 2 Sheets—Sheet 1.
W. A. & T. B. HULME.
MACHINE FOR SHARPENING AND GUMMING SAWS.
No. 564,077. Patented July 14, 1896.
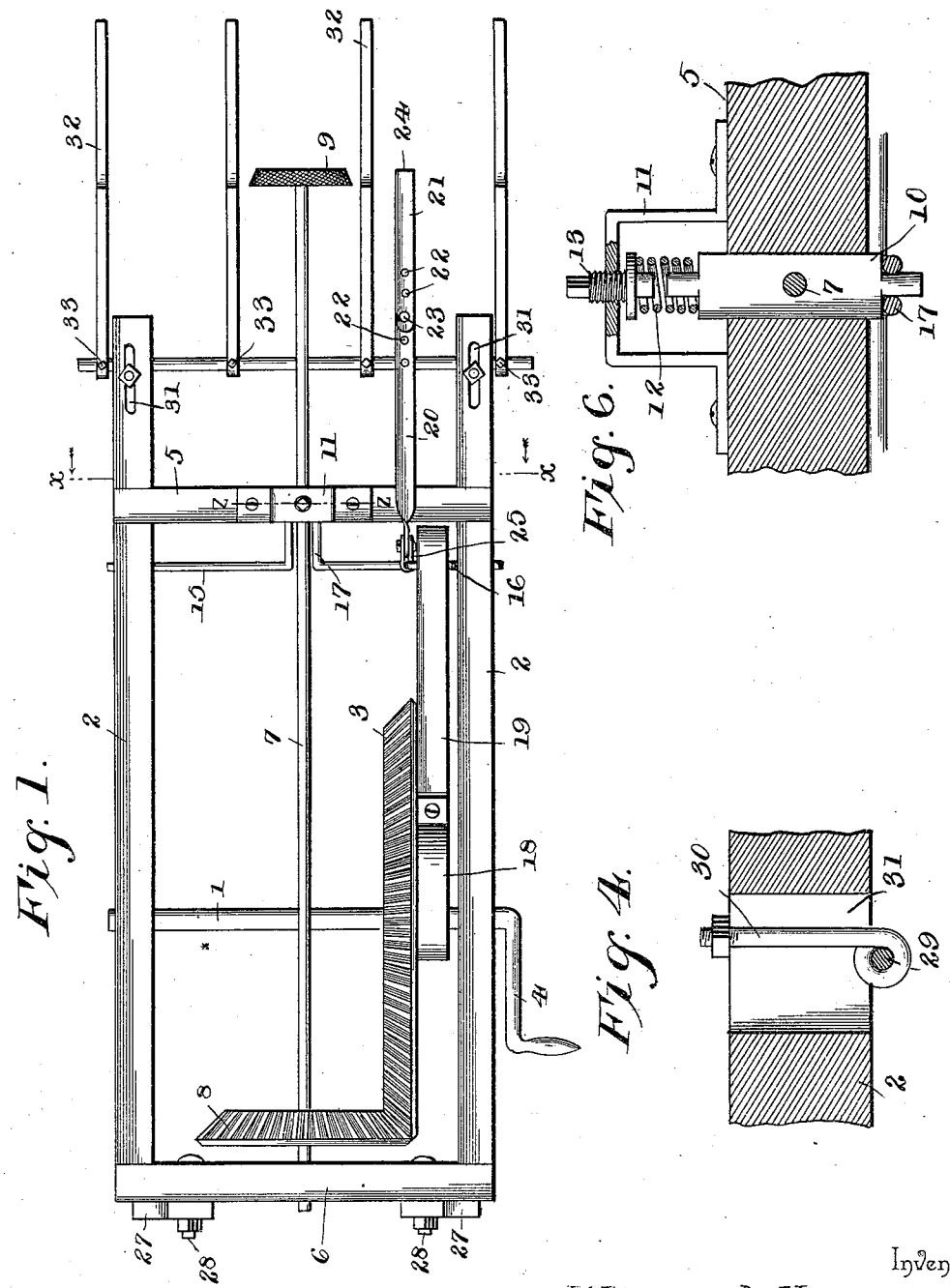
Witnesses
Chas. A. Ford
V. B. Hillyard
Inventors
William A. Hulme,
and Thomas B. Hulme,
By their Attorneys,
C. A. Snow & Co.

(No Model.) 2 Sheets—Sheet 2.
W. A. & T. B. HULME.
MACHINE FOR SHARPENING AND GUMMING SAWS.
No. 564,077. Patented July 14, 1896.
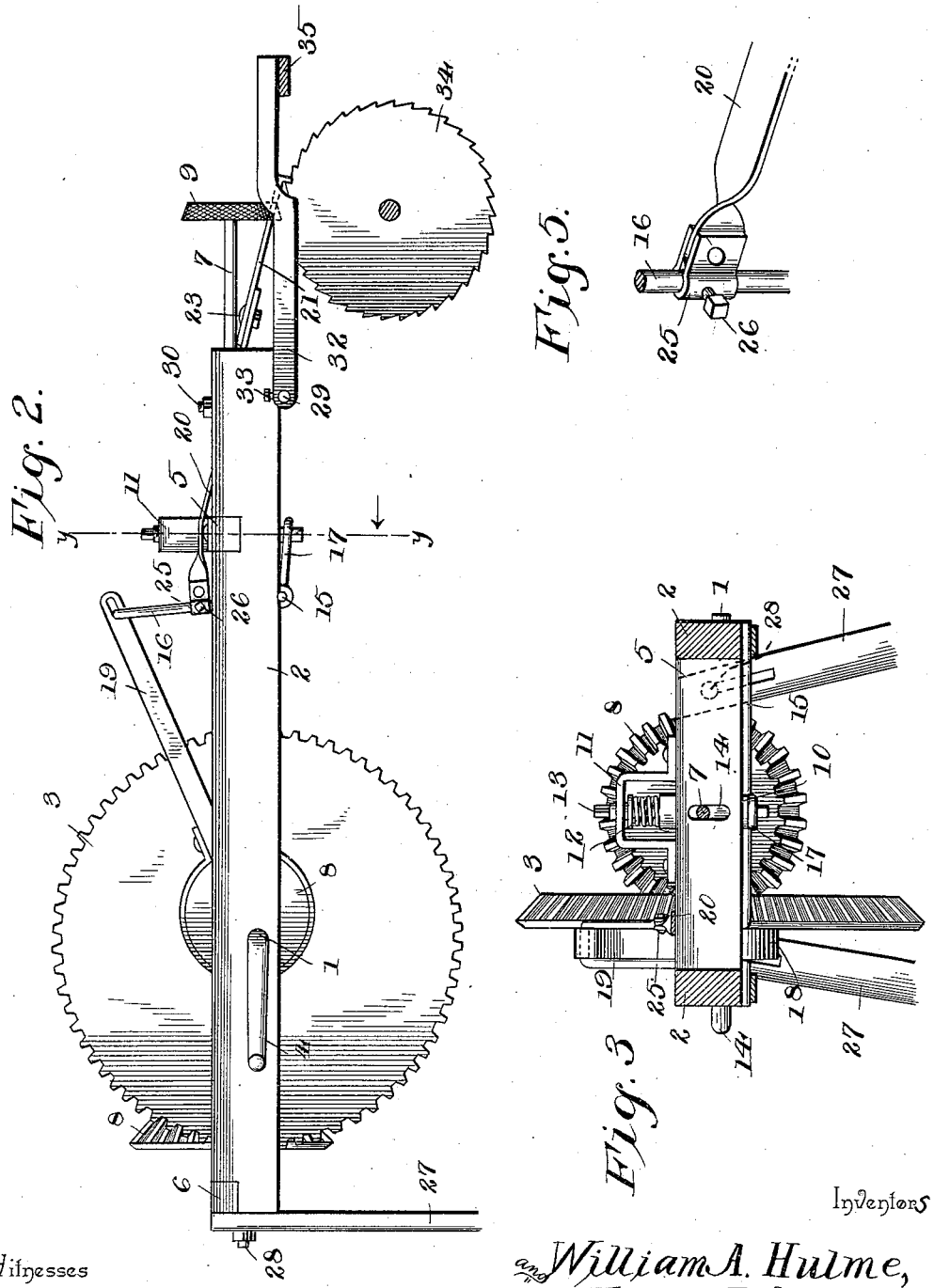
Witnesses
Chas. A. Ford.
V. B. Hillyard.
Inventors
William A. Hulme,
Thomas B. Hulme,
By their Attorneys, C. A. Snow & Co.

UNITED STATES PATENT OFFICE.

WILLIAM A. HULME AND THOMAS B. HULME, OF SALONA, TEXAS, ASSIGNORS OF ONE-FOURTH TO J. V. CLARK, OF SAME PLACE.

MACHINE FOR SHARPENING AND GUMMING SAWS.

SPECIFICATION forming part of Letters Patent No. 564,077, dated July 14, 1896.

Application filed October 7, 1895. Serial No. 564,940. (No model.)

*To all whom it may concern:*

Be it known that we, WILLIAM A. HULME and THOMAS B. HULME, citizens of the United States, residing at Salona, in the county of Montague and State of Texas, have invented a new and useful Machine for Sharpening and Gumming Gin-Saws, of which the following is a specification.

This invention has for its object to provide an improved machine whereby the gumming and sharpening of cotton-gin saws can be effected in a comparatively short interval of time and without unnecessarily fatiguing the operator and which will automatically feed the saws so as to bring the teeth successively into position to be operated upon, and which will cut the teeth uniformly, thereby preserving the circular outline of the saws and preserving the teeth of a uniform length and appearance.

With these and other objects in view, such as are attendant upon the nature of the invention, the latter consists of the novel features and the peculiar construction and combination of the parts, which hereinafter will be more particularly set forth and claimed, and which are illustrated in the accompanying drawings, in which—

Figure 1 is a top plan view of a saw gumming and sharpening machine constructed in accordance with this invention. Fig. 2 is a side elevation thereof, showing it applied. Fig. 3 is a transverse section on the line X X of Fig. 1, looking in the direction of the arrow. Fig. 4 is a detail view showing one of the adjustable eyebolts at the front end of the machine. Fig. 5 is a detail view showing the instrumentality for adjustably connecting the feeder with its actuating crank or arm. Fig. 6 is a detail section on the line Z Z of Fig. 1, on a larger scale.

Referring to the drawings, in which similar numerals denote corresponding parts in all the figures, 1 indicates a transverse shaft, which is journaled in the longitudinal beams 2 of a suitable frame and upon which is mounted a bevel gear-wheel 3 and which is provided at one end with an operating-crank 4, by means of which the said shaft 1 is rotated in its bearings when the machine is in operation. The longitudinal beams 2 are connected by means of transverse beams 5 and 6, and with the latter form a substantial framework which carries the operating parts. A longitudinal shaft 7 is journaled in suitable bearings provided in the transverse beams 5 and 6, and a bevel-pinion 8 is adjustably secured thereupon and meshes with the bevel gear-wheel 3, and the circular file-cutter 9 is placed upon the front end of the said longitudinal shaft 7, and its peripheral edge portion is beveled so as to correspond with the spaces between the teeth of the gin-saw.

The bearing 10 is adjustably mounted in a suitable mortise or guideway provided in the transverse beam 5, and it is adapted to receive a vertical reciprocating movement, so as to oscillate the longitudinal shaft 7 and advance the file-cutter to its work and withdraw the same to admit of the next tooth being brought into position to be operated upon. A keeper of arch-shaped guide 11 is placed upon the transverse beam 5, and a spring 12 is interposed between the bearing 10 and the upper portion of the said keeper and exerts a downward pressure upon the bearing, so as to return the file-cutter into a working position after it is released from the force exerted to withdraw it from the tooth previously acted upon. A set-screw 13 is threaded into an opening in the upper end of the keeper 11 and engages with the adjacent end of the spring 12, and its purpose is to vary the tension of the said spring by a proper adjustment of the set-screw in the keeper, as will be readily appreciated. A vertical slot 14 is formed in the transverse beam 5 for the passage of the longitudinal shaft 7 and to admit of the vertical movement of the said shaft incident to the movements of the file-cutter to and from its work.

A rock-shaft 15 is journaled at its ends to the front portions of the longitudinal beam 2, and it is provided with crank-arms 16 and 17, which may be of any formation, but which are preferably constructed by forming loops in the said rock-shaft. The crank-arm 17 is centrally disposed and engages with the lower end of the adjustable bearing 10, and its purpose is to impart an upward movement to the said bearing to carry the circular file-cutter away from the tooth upon which it is operating when it is required to bring another tooth into position to be sharpened.

An eccentric 18 or equivalent device is located upon the side of the bevel gear-wheel 3, and the rear end of a pitman 19 is engaged therewith, and its front end has connection with the crank-arm 16, so as to impart a rocking movement to the shaft 16 when the machine is performing efficient service.

The feeder comprises an arm formed of two parts 20 and 21, which are adjustably connected together, each part having a series of openings 22 formed longitudinally thereof for the reception of a pin or fastening 23, by means of which the said parts are secured in the adjusted position. The front end of the outer part 21 has its extremity 24 bent so as to form a pendent portion 24 to engage with the teeth of the gin-saw and move the latter step by step, so as to bring each tooth successively into position to be sharpened. The inner end of the feeder has adjustable connection with the crank-arm 16, whereby its throw can be regulated to suit the size of the saw-teeth to be sharpened. A clip 25 is adjustable along the length of the crank-arm 16 and is held in the located position by means of a binding-screw 26, and the feeder or the inner part 20 thereof has pivotal connection therewith, so as to admit of the bent end 24 riding over the inclined side of a saw-tooth during the forward stroke or movement of the said feeder.

In planning and constructing the machine the parts are proportioned and disposed so that the feeder and the file-cutter make one complete movement during each revolution of the bevel gear-wheel 3, and so that when the feeder is moving rearwardly to bring a new tooth into position the file-cutter is lifted out of the way, and when the file-cutter is in operation the feeder is gradually advancing to a position so as to bring another tooth in proper position to be sharpened after the file-cutter is again elevated or withdrawn from engagement with the tooth just operated upon.

The machine is adjustably supported at its rear end upon legs 27, which latter have adjustable connection with the frame in any convenient manner, preferably by means of a clamp-bolt and nut 28, operating in a longitudinal slot provided in the upper end portions of each leg. A transverse shaft or bar 29 is placed in the eyes of vertically-disposed eyebolts 30, and the latter are adjustable in longitudinal slots 31, formed in the front ends of the longitudinal beams 2. Supporting-arms 32 are placed upon the bar or shaft 29 and are held thereupon in the required adjusted position by means of binding-screws 33, and the front ends of the supporting-arms are curved upwardly and forwardly so as to clear the gin-saws 34 and obtain a purchase upon a transverse portion 35 of the gin-framework. By reason of the adjustable connection of the bar 29 with the longitudinal beams of the machine the latter can be properly fitted to the different makes of saw-gins and the supporting-arms 32 can be properly positioned by being turned and slid upon the bar 29, so as to obtain a proper bearing upon a convenient portion of the gin.

When the machine is in operation, motion is imparted to the circular file-cutter and to the feeder by rotating the shaft 1, which carries the bevel gear-wheel 3, which imparts a corresponding movement to the shaft 7 and the eccentric 18 in the manner set forth, and which through the connections herein described, operate the parts 9 and the feeder so as to attain the desired result in the manner herein explained.

Various changes in the form, proportion, and minor details of construction may be resorted to without departing from the spirit or sacrificing any of the advantages of this invention.

What is claimed is—

1. In a saw gumming and sharpening machine the combination of a shaft journaled in bearings and carrying the circular file-cutter, a beam provided with a vertically-movable bearing having the said shaft journaled therein, a guide secured to the beam, a spring interposed between the guide and the movable bearing, and actuating mechanism for imparting a reciprocating movement to the said movable bearing whereby an oscillatory movement is imparted to the aforesaid shaft and its cutter advanced to and withdrawn from the work, substantially in the manner set forth for the purpose described.

2. In a saw gummer and sharpener the combination of a shaft mounted in bearings and provided with a circular file-cutter, a beam having a movable bearing forming a support for the said shaft, a spring obtaining a purchase upon the beam or a part thereof and exerting a pressure upon the said bearing, a rock-shaft having an arm in engagement with the said bearing, a feeder operatively connected with the said rock-shaft, and actuating mechanism for operating the rock-shaft to move the adjustable bearing in opposition to the pressure of the spring acting thereagainst, and to reciprocate the feeder, substantially as set forth for the purpose described.

3. In a saw gummer and sharpener the combination with the framework carrying the cutting devices of a rock-shaft having crank-arms 16 and 17, a feeder having pivotal and adjustable connections with the crank-arm 16 and composed of parts which are adjustably connected together, whereby the throw of the feeder can be regulated and the operating end of the said feeder properly fitted to the saw, and a movable bearing for the shaft carrying the cutter having connection with the crank-arm 17, substantially as set forth for the purpose described.

4. In combination a longitudinally-disposed shaft carrying a circular file-cutter, a vertically-adjustable bearing therefor, a spring operating upon the said bearing, a rock-shaft having a crank-arm in engagement with the said bearing, and having a second crank-arm, an eccentric operatively connected with the said second crank-arm for rocking its shaft, and a feeder having both a pivotal and an adjustable connection with the said second crank-arm and composed of parts which are adjustably connected together, substantially in the manner set forth for the purpose described.

In testimony that we claim the foregoing as our own we have hereto affixed our signatures in the presence of two witnesses.

WILLIAM A. HULME.
    THOMAS B. HULME.

Witnesses:
 H. H. McPHERSON,
 R. H. ROBERSON.